US011308474B1

(12) United States Patent
Gupta (10) Patent No.: US 11,308,474 B1
(45) Date of Patent: Apr. 19, 2022

(54) SMART NODE TO NODE PAYMENT SYSTEMS (71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/209,551

(22) Filed: Mar. 23, 2021

(51) Int. Cl.
G06Q 20/22 (2012.01)
G06Q 20/32 (2012.01)

(52) U.S. Cl.
CPC ....... *G06Q 20/223* (2013.01); *G06Q 20/3278* (2013.01)

(58) Field of Classification Search
CPC ..................... G06Q 20/3278; G06Q 20/223
See application file for complete search history.

(56) References Cited

U.S. PATENT DOCUMENTS

| 9,646,300 | B1 | 5/2017 | Zhou et al. |
| 9,704,151 | B2 | 7/2017 | Zhou et al. |
| 9,704,152 | B1 | 7/2017 | Rolf |
| 9,830,589 | B2 | 11/2017 | Xing |
| 9,849,671 | B2 | 12/2017 | Shepherd |
| 2016/0086153 | A1 | 3/2016 | Rolf |
| 2017/0323285 | A1 | 11/2017 | Xing |
| 2019/0286805 | A1 | 9/2019 | Law et al. |

OTHER PUBLICATIONS

Max Freeman-Mills, "Apple AR Glasses Could Land in 2022—According to New Report," https://www.wareable.com/ar/apple-augmented-reality-ar-smartglasses-3501, Wareable Ltd., Nov. 12, 2019.
"Bluetooth," https://en.wikipedia.org/wiki/Bluetooth, Wikimedia Foundation, Inc., Oct. 14, 2020.
"Connectivity," https://developers.google.com/glass-enterprise/guides/connectivity, Google Developers, Glass Enterprise Edition 2, Jul. 27, 2020.
"Design Guidelines," https://developers.google.com/glass-enterprise/guides/design-guidelines, Glass Enterprise Edition 2, Google Developers, May 21, 2019.

(Continued)

*Primary Examiner* — Bennett M Sigmond
*Assistant Examiner* — Marla Hudson
(74) *Attorney, Agent, or Firm* — Weiss & Arons LLP (57) ABSTRACT Methods for smartwatch-to-smartwatch payment systems is provided. Methods include receiving a transfer of funds initiation at a first smartwatch. The transfer of funds initiation may include an identifier, an amount and a personal identification number ("PIN"). Methods include transmitting the transfer of funds initiation from the first smartwatch to a second smartwatch. Methods may include receiving a notification on the second smartwatch. The notification may include a first smartwatch telephone number and the transfer of funds initiation. Methods may include transmitting a transfer of funds request from the second smartwatch to an entity. The transfer of funds request may include the first smartwatch telephone number, the transfer of funds initiation and the second smartwatch telephone number. Methods may include retrieving a first account and a second account from the entity. Methods may include transferring funds from the first account to the second account.

6 Claims, 5 Drawing Sheets (56) References Cited

OTHER PUBLICATIONS

"Development Tips," https://developers.google.com/glass-enterprise/guides/development-tips, Glass Enterprise Edition 2, Google Developers, Aug. 12, 2020.
"Get Started," https://develovers.google.com/glass-enterprise/guides/get-started, Glass Enterprise Edition 2, Google Developers, Aug. 12, 2020.
"Inputs and Sensors," https://developers.google.com/glass-enterprise/guides/inputs-sensors, Google Developers, Glass Enterprise Edition 2, Jul. 29, 2020.
"Smartglasses," https://en.wikipedia.org/wiki/Smartglasses, Wikimedia Foundation, Inc., Oct. 1, 2020.
"Tech Specs," https://www.google.com/glass/tech-specs/, Glass Enterprise Edition 2, Retrieved on Oct. 19, 2020.
Michael Sawh, "The Best AR Glasses and Smartglasses 2020: Snap, Vuzix and More," https://www.wareable.com/ar/the-best-smartglasses-google-has-and-the-rest, Wareable Ltd., Jul. 1, 2020.
"User Interface," https://developers.google.com/glass-enterprise/guides/user-interface, Google Developers, Glass Enterprise Edition 2, Feb. 27, 2020.
"Vue Lite Cygnus," https://vueglasses.com/collections/eyeglasses-vue-life-cygnus-eyeglasses?variant=35797226291363, Vigo Technologies Inc., Retrieved on Oct. 19, 2020.
"Vue: Your Everyday Smart Glasses," https://www.kickstarter.com/orojects/vue/vue-your-everyday-smartglasses, Kickstarter, PBC, Retrieved on Oct. 19, 2020.
"Nano-Thin Flexible Touchscreens Could Be Printed Like Newspaper," https://www.sciencedaily.com/releases/2020/01/200124112927.htm, Science Daily, Jan. 24, 2020.
"Network Interface Controller," https://en.wikipedia.org/wiki/Network_interface_controller, Wikimedia Foundation, Inc., Jan. 11, 2021.
"Network Interface Card (NIC)," https://searchnetworking.techtarget.com/definition/network-interface-card, TechTarget, Retrieved on Feb. 4, 2021.
"Bluetooth Chips Selection Guide," https://www.globalspec.com/learnmore/semiconductors/communications_rf_wireless_chips/. Bluetooth chips, GlobalSpec, Retrieved on Mar. 16, 2021.
"Exclusive: What's Inside a SmartWatch?" https://www.globalsources.com/gsol/l/activity-tracking/a/9000000132594.htm, Publishers Representatives Limited, Dec. 15, 2014.
"Golf GPS Watch Industry Infographics," https://visual.ly/community/Infographics/business/golf-gps-watch-industry-infographics, Rock Content, Apr. 8, 2020.
Mark Prigg, "What's Inside a $180 Smartwatch: Hackers Have Taken Apart LG's G Watch," https://www.dailymail.co.uk/sciencetech/article-2685311/Inside-smartwatch-Hackers-reveal-really-goes-Android-powered-watches-Samsung-LG.html, Daily Mail, Jul. 8, 2014.
"Printed Circuit Board," https://en.wikipedia.org/wiki/Printed_circuit_board, Wikimedia Foundation, Inc., Mar. 16, 2021.
"SmartWatch," https://en.wikipedia.org/wikt/Smartwatch, Wikimedia Foundation, Inc., Mar. 9, 2021.
Alex Udanis, "Teardown Tuesday: Budget Smartwatch," https://www.allaboutcircuits.com/news/teardown-tuesday-budget-smartwatch/, All About Circuits, Apr. 12, 2016.
"The Future of Health is on your Wrist," https://www.apple.com/watch/?afid=p238%, Apple. Inc., Retrieved on Mar. 11, 2021.
Alyssa Wood, "Definition Smartwatch," https://internetofthingsagenda.techtarget.com/definition/smartwatch#:~:text=A%20smartwatch%20is%20a%20wearable,or%20other%20time%2Dkeeping%20device.&text=Such%20watches%20may%20have%20their,with%20walking%20or%20drving%20directions., TechTarget, Retrieved on Mar. 10, 2021.

SMART NODE TO NODE PAYMENT SYSTEMS

FIELD OF TECHNOLOGY

Aspects of the disclosure relate to smartwatches. Specifically, this disclosure relates to smartwatch communications.

BACKGROUND OF THE DISCLOSURE

Smartwatches have become more common in recent years. For the purposes of the disclosure, smartwatches may be understood to mean wearable watches that include one or more internal processors.

Smartwatches are compact devices and usually stay with the user. Therefore, smartwatches are easily accessible. Because of the ease of access associated with smartwatches, it would be desirable for a smartwatch to communicate with another smartwatch.

It would be further desirable for such communication to obviate the need for associated mobile devices, desktop computers, laptop computers, card devices or any other devices.

It would be yet further desirable for the communication to include payment instructions and/or payment data.

It would be yet further desirable for the communication between smartwatches to enable a first smartwatch to transfer funds from an account associated with the first smartwatch to an account associated with a second smartwatch.

SUMMARY OF THE DISCLOSURE

Apparatus and methods for smartwatch-to-smartwatch transactions are provided. For the purposes of this application, smartwatches are wearable devices that are typically worn on a wrist. Smartwatches may include one or more processors. Smartwatches may execute various applications.

Exemplary smartwatch components may include standard watch components such as a strap, a casing and a face.

Exemplary smartwatch components specific to a smartwatch may include a micro control unit ("MCU"), a central processing unit ("CPU"), a graphical processing unit ("GPU"), one or more faces including one or more screens, one or more sensors, a Bluetooth chipset, a haptic feedback unit, a global positioning system ("GPS") receiver, a loudspeaker, a microphone, a printed circuit board ("PCB"), a power management unit, read only memory ("ROM"), random access memory ("RAM"), a touch screen controller, a waterproof seal, a universal serial bus ("USB") controller, charging connectors, a radio receiver (Wi-Fi), a digital signal processor, a near-field communication ("NFC") component, a micro-electro-mechanical system ("MEMS") and a camera.

Exemplary MCUs may control sensors and processors included in the smartwatch.

Exemplary CPUs may execute the main processing on the smartwatch. Many smartwatch CPUs are licensed advanced reduced instruction set computing (RISC) machines ("arm") ® processors.

Exemplary GPUs may be processors that are used to reduce the workload on the CPU when rendering and generating the graphics on the smartwatch. The GPU may be a specialized circuit designed to rapidly manipulate and alter memory to accelerate the creation of images.

Exemplary smartwatch faces range from 30-60 mm long by 30-60 mm wide. Exemplary smartwatch screens may include a depth of approximately 5 mm to 20 mm. Exemplary smartwatch screens may have capacitive touch screens. Exemplary smartwatch screens can be made of various materials, such as traditional liquid crystal display ("LCD"), sharp memory LCD, in-plane switching ("IPS") LCD with higher pixel density, electronic-ink ("E-ink"), organic light emitting diode ("OLED"), OLED with higher pixel density and interferometric modulator display technology (also referred to as mirasol display technology).

The display may be laminated onto polished sapphire crystal or other suitable substances. The sapphire crystal may be synthetic sapphire crystal. The display may be laminated onto ion x glass. It should be appreciated that ion x glass may be more flexible than sapphire crystal.

Exemplary sensors may include three categories of sensors. A first category may include motion sensors. Motion sensors may include accelerator, gyroscope, geomagnetic sensor, atmospheric pressure sensor and any other suitable motion sensors. A second category of sensors may include biosensors. Biosensors may include any suitable biosensors. A third category of the sensors may include environmental sensors. Environmental sensors may include humidity sensor, gas sensor, pH sensor, UV sensor, ambient light sensor, dust particles sensor, pressure sensor, microphone sensor, compass sensor and any other suitable environmental sensors. These sensors may collect data and then transfer the data to an internal watch processor, such as the CPU or the display processor.

An exemplary smartwatch battery may include Lithium ion ("Li-ion") or Lithium polymer batteries. Lithium Polymer batteries have a higher power capacity that Li-ion batteries and therefore are a superior choice for smartwatches.

An exemplary Bluetooth® chipset may include Bluetooth® and Bluetooth Low Energy® ("BLE") chips. These Bluetooth® chips may be board level components that broadcast in the 2.4 GHz radio band. Bluetooth® technology may facilitate short-range cable protocols and networking. There may be several types of Bluetooth® chips. The Bluetooth® chips may include Bluetooth® baseband controllers, Bluetooth® radio frequency transceivers, single chip solutions, Bluetooth® modules and Bluetooth® cores. Bluetooth® baseband controllers may combine the protocol stack, link controller, link manager and host interface firmware of the Bluetooth® specification in a single integrated circuit. Bluetooth® radio frequency transceivers are transmitters/receivers that operate in the 2.4 GHz range and comply with Bluetooth® Special Interest Group ("SIG") requirements. Single chip solutions are Bluetooth®-compliant integrated circuits that incorporate both baseband controllers and RF transceivers. Bluetooth® modules are self-contained components. Bluetooth® cores are intellectual property cores that can be loaded into field-programmable gate arrays or application specific integrated circuits.

An exemplary haptic feedback unit may provide tactile sensors to a user. Examples of haptic feedback may include vibrotactile, electrotactile, ultrasound and thermal feedback.

An exemplary GPS receiver may be capable of receiving information from GPS satellites. As such, GPS receivers may be able to determine the position of the smartwatch based on the information received from the GPS satellites.

An exemplary loudspeaker is an electroacoustic transducer. A loudspeaker is a device that converts an electrical audio signal into a corresponding sound. The loudspeaker may provide audio capabilities to the smartwatch. The loudspeaker may enable a user to conduct a telephone conversation via the watch.

An exemplary microphone is a transducer that converts sound into an electrical signal. The electrical signal can be amplified, transmitted or recorded. The microphone may be used to accept voice input from a user of the smartwatch. The microphone may enable a user to conduct a telephone conversation via the smartwatch.

An exemplary printed circuit board ("PCB") mechanically supports and electrically connects electrical or electronic components using conductive tracks, pads and other features. The conductive tracks, pads and other features may be etched from one or more sheets layers of copper. The sheet layers of copper may be laminated onto a non-conductive substate. The sheet layers of copper may be laminated between sheet layers of a non-conductive substrate.

An exemplary power management unit may be a microcontroller that governs power functions of the smartwatch. As such, the power management unit may control the battery function.

Exemplary read-only memory ("ROM") may be a type of non-volatile memory that can be read at high speed but is not capable of being changed by program instructions.

Exemplary random-access memory ("RAM") may include memory that can be written to, and read from, in any order.

An exemplary touch screen controller is a controller that detects positional contact pressure on a visual display surface. One or more fingers may be used as pointing devices. The touch screen controllers may interface between the CPU or MCU and the touchscreen element, such as the display.

An exemplary waterproof seal may surround the electrical components inside the smartwatch. The waterproof seal may provide waterproof qualities to the smartwatch.

An exemplary universal serial bus ("USB") controller is a controller that controls the input of a USB device and/or cable. In some instances, when a USB cable is used to charge the smartwatch, the connection between the USB controller and the USB cable may be a magnetic connection. The magnetic connection may appear to lack the typical USB port. This magnetic connection may avoid the space required when using a typical standard USB port, mini-USB port or micro-USB port. This magnetic connection may also enable the waterproof compartment inside the smartwatch to maintain its waterproof capabilities.

Exemplary charging connectors may include the USB controller described above. Exemplary charging connectors may include any other suitable charging connectors.

An exemplary radio receiver may be a receiver capable of receiving radio waves. These radio waves may provide Wi-Fi and internet capabilities to the smartwatch.

An exemplary digital signal processor is a microprocessor chip with architecture augmented for the operational needs of digital signal processing.

An exemplary NFC component may provide NFC capabilities to the smartwatch. As such, the NFC component may enable the smartwatch to communicate with other smartwatches using NFC.

An exemplary MEMS may be a system that includes technology of microscopic devices. The system may include moving parts. In addition to micro-electro-mechanical components, system parts may also be rated on the nanoscale. As such, the system may include nano-electro-mechanical parts and nano-electro-mechanical technology. Because a relatively large amount of computation is performed within a relatively small region, various smartwatch components and processors may be made of, and/or include, MEMS components.

An exemplary smartwatch camera may capture photographs and/or videos.

One or more software modules may execute on the aforementioned processors. The one or more software modules may be stored in one or more memory locations located within the aforementioned memory included in the smartwatch. The one or more software modules may, in the alternative, be referred to as applications. The applications may enable the smartwatch to execute various tasks.

The method may include generating a transaction initiation at a first smartwatch. The transaction initiation may be the start of a transaction. Such a transaction may be a transfer of funds transaction or any other suitable transaction. In some embodiments, the first smartwatch may request a transfer of funds from an account associated with the first smartwatch to an account associated with a second smartwatch. In certain embodiments, the first smartwatch may request a transfer of funds from an account associated with the second smartwatch to an account associated with the first smartwatch.

In certain embodiments, the first smartwatch may request a transfer of funds from an account associated with the first smartwatch to a plurality of accounts associated with a plurality of counterparty smartwatches. As such, the first smartwatch may communicate with the plurality of smartwatches.

It should be appreciated that the first smartwatch may not have knowledge of an account number of the account associated with the second smartwatch. As such, the transaction initiation may trigger a transmission from the first smartwatch to the second smartwatch. The transmission may include a request for a second smartwatch telephone number.

The second smartwatch may respond to the transmission. The response may include the second smartwatch telephone number. The first smartwatch may transmit the second smartwatch telephone number to an entity. The entity may include a telephone number to account number resolver module. Such a telephone number to account number resolver module may identify an account number associated with a mobile telephone number. As such, the mobile telephone number to account number resolver module may identify an account number associated with the second smartwatch.

Once the account number associated with the second smartwatch is identified, the account number associated with the second smartwatch may be transmitted to the first smartwatch.

In some embodiments, the first smartwatch and/or the second smartwatch may maintain data in an internal storage location. When transactions between the first smartwatch and the second smartwatch have been executed, the first smartwatch and/or the second smartwatch may maintain data relating to the transaction in the internal storage location. The data may include the account number associated with the second smartwatch telephone number. As such, in the event the first smartwatch and the second smartwatch previously communicated, the first smartwatch may not communicate with the entity to determine the account number. Rather, the first smartwatch may locate the account number within the internal storage location.

Upon receipt and/or determination of the account number associated with the second smartwatch at the first smartwatch, the first smartwatch may request a transaction amount and a personal identification number ("PIN") from a user of the first smartwatch.

The transaction amount, PIN and/or any other suitable user input may be received at the first smartwatch, from the user, in a variety of ways. For example, the user input may be received from the user via touch gestures to one or more dynamic or static buttons on the first smartwatch.

The user input may also include any suitable combination of, or pattern of, tapping, squeezing, swiping and any other suitable touch-based input.

The user input may also be received from the user via tap gestures to one or more portions of the first smartwatch. Tap gestures may include receiving a series of taps. Each series of taps may correspond to a different value, such as a numerical value. Each series of taps may be separated from another series of taps with a delimiter.

In an example, a user may want to enter a PIN. The numerical value of the PIN may be 6543. As such, the user may tap six times, enter a delimiter, tap five times, enter a delimiter, tap four times, enter a delimiter and tap three times.

Examples of delimiters may include pausing for a predetermined time period, swiping, squeezing, holding a tap for a predetermined time period and any other suitable delimiter.

Upon identifying the tap gestures, the sensor(s) and/or associated processors, included in the smartwatch, may translate the tap gesture(s) into user input. The user input may be based on a user input structure. The user input structure may be a digital number pad. In some embodiments, the user input structure may be received from an external processor.

Upon receipt of the transaction amount and the PIN at the first smartwatch, the first smartwatch may generate a transaction request. The transaction request may include an account number associated with a first smartwatch telephone number, an account number associated with the second smartwatch telephone number, the transaction amount and the PIN.

The first smartwatch may transmit the transaction request to the entity. The entity may or may not be the same entity that is associated with the telephone number to account number resolver module. The entity may process the transaction request. The entity may transmit a transaction confirmation to the first smartwatch and/or the second smartwatch.

In some embodiments, the first smartwatch and/or the second smartwatch may authenticate the user before, during and/or after the transaction initiation and/or transaction generation. An authorization module, included in the first smartwatch and/or the second smartwatch, may authenticate the user of the smartwatch. The authentication may be executed at an authorization module included in the smartwatch. The authorization module may authenticate the user based on a group of detected user behavioral characteristics. The group of detected user behavioral characteristics may include gait, speed, voice detection, head movements and body movements. The authorization module may authenticate the user using any suitable authentication method. The authorization module may authenticate the user based on entry of a PIN.

The authorization module may also authenticate the user based on receipt of a predetermined touch-based musical pattern. A touch-based musical pattern may include a user tapping the touch screen with a predetermined number of fingers a predetermined number of times. It should be appreciated that each tap may utilize a different number of fingers. For example, a musical pattern may include a two finger tap three times followed by a one finger tap two times followed by a four finger tap one time.

It should be appreciated that both the tap gestures and the musical pattern may protect the privacy of the data being entered into the smartwatch. This may be because a passerby may be unable to decipher the entered data by viewing the user tapping the smartwatch. Additionally, the tap gestures and the musical pattern may enable a visually-impaired person to interact with the smartwatch. The visually-impaired person may be able to unlock or otherwise authenticate using the tap gestures or musical pattern. Additionally, the visually-impaired person may be able to enter user input, such as a PIN or amount, using the tap gestures or musical pattern.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Apparatus and methods for smartwatch-to-smartwatch payment systems is provided.

A smartwatch may include a plurality of hardware components and software components, such as those described in detail in the summary of the disclosure. The hardware components may include a watch face and a band. The watch face may rest on a user's wrist. The band may wrap around the user's wrist and secure the watch face relative to the user's wrist.

The hardware components may also include one or more microprocessors. At least one of the microprocessors may be operable to initiate a transaction.

The hardware components may also include one or more displays. At least one of the displays may display software displays. The microprocessor may instruct the display regarding the software displays.

The hardware components may also include a battery. The battery may power the display and/or the microprocessor.

The hardware components may also include a nano wireless network interface card ("NIC"). The nano wireless NIC may establish communication with a wireless network.

The hardware components may also include an active NFC reader. The active NFC reader may detect one or more other smartwatches within a predetermined proximity to the smartwatch. The active NFC reader may establish communication with the one or more other smartwatches.

The smartwatch may also include a plurality of software components.

The plurality of software components may include a digital number pad. The digital number pad may display numerical digital software selections to the user. The digital number pad may also receive numerical input from the user. In some embodiments, the digital number pad may not operate as a typical digital number pad. For example, the digital number pad may accept tap gesture input and/or musical patterns that correspond to one or more numerals.

The plurality of software components may also include an information controller module. The information controller module may capture data via the digital number pad. The captured data may include a transaction amount and/or a PIN. As such, the received numerical input may correspond to the transaction amount and/or the PIN.

The plurality of software components may also include an NFC controller module. The NFC controller module may operate as the software for the active NFC reader. As such, the NFC controller module may activate NFC communication via the NFC reader.

The NFC controller module may also send and/or receive user data, payment data and/or authentication data. As such, the NFC controller module may receive the captured data from the information controller module. The captured data may include the transaction amount and/or the PIN. The NFC controller module may transmit the captured data to a wireless controller module.

The NFC controller module may communicate with the one or more other smartwatches. As such, the NFC controller module may communicate with a second smartwatch. The second smartwatch may be one of the one or more other smartwatches. The communication from the smartwatch to the second smartwatch may include a request for a second smartwatch mobile telephone number.

The NFC controller module may receive the second smartwatch mobile telephone number from the second smartwatch.

The plurality of software components may also include the wireless controller module. The wireless controller module may interface between the nano wireless NIC and an external Wi-Fi device. The external Wi-Fi device may be included in the wireless network. The Wi-Fi device may be within sufficient proximity to the smartwatch to communicate with the software and hardware components included in the Wi-Fi device.

The wireless controller module may also transmit the captured data to an external entity. The transmission of the captured data may be communicated over the wireless network.

The NFC controller module and/or the wireless controller module may include multiple modes. The modes may include discoverable mode and non-discoverable mode. In a discoverable mode, the smartwatch may be actively searching for other devices. In a non-discoverable mode, the smartwatch may not be actively searching for devices.

The plurality of software components may also include a telephone number to account number resolver module. In such embodiments, the telephone number to account number resolver module may be internal to the smartwatch. The telephone number to account number resolver module may receive a telephone number from the NFC controller module.

The telephone number to account number resolver module may communicate with the external entity and/or internal storage location to identify an account number associated with a received telephone number. The telephone number may be a mobile telephone number.

The mobile telephone number may be associated with one of the one or more other smartwatches. The mobile telephone number may be associated with the second smartwatch. As such, the telephone number to account number resolver module may identify an account number associated with the mobile telephone number associated with the second smartwatch.

In some embodiments, the smartwatch may be associated with multiple mobile telephone numbers. The multiple mobile telephone numbers may be stored in a storage location included in the smartwatch. The smartwatch may also be associated with multiple account numbers. In certain embodiments, each telephone number may be associated with an account number. As such, in order to generate a transaction, the wearer of the smartwatch may select a telephone number. The telephone number to account number resolver module may identify the account number associated with the selected telephone number. As such, the telephone number to account number resolver module may identify the account number associated with the smartwatch.

The plurality of software components may also include an amount and PIN verification module. The amount and PIN verification module may verify the transaction amount and/or the PIN with the external entity.

As stated above, the microprocessor, included in the smartwatch, may initiate a transaction. The microprocessor may generate a transaction request. The transaction request may be a transfer of funds instruction. A benefactor account of the transaction request may be the account associated with the telephone number of the initiating smartwatch. A beneficiary account of the transaction request may be the account associated with the second smartwatch mobile telephone number.

The transaction request may include an account number associated with the initiating smartwatch. The transaction request may include the transaction amount. The transaction request may include the PIN. The transaction request may include the smartwatch account number associated with the second smartwatch mobile telephone number.

The microprocessor may transmit the generated transaction request to the entity. The entity may process the transaction request.

Upon completion of processing the transaction request at the entity, the entity may transmit a confirmation to the initiating smartwatch and/or to the second smartwatch. The confirmation(s) may notify regarding the completion of the transaction request processing.

The confirmations may also include details relating to the transaction. Such details may include one or more account numbers and/or a portion of one or more account numbers. Such details may also include a transaction amount. Such details may also include a date-time stamp.

At times, a smartwatch may be unable to connect to a wireless network, such as the internet. As such, one or more smartwatches involved in a transaction may communicate with one another using NFC, Bluetooth® or another suitable technology. The transaction may be completed offline—i.e., without communicating with a wireless network. The transaction data may be stored within the smartwatches. The transaction data may include the following: user information (may be the benefactor and/or beneficiary), transaction amount, counterparty user information (may be the benefactor and/or beneficiary), authentication information, location information, past payment information, past purchase information and any other suitable information. The transaction data may be stored in a blockchain using an immutable cryptographic signature which cannot be altered. When one or both of the smartwatches are reconnected to a network, the transactions can be picked from the blockchain and forwarded for processing at one or more financial institutions.

In some embodiments, in order to facilitate smartwatch to smartwatch transactions, currency may be stored on the smartwatch. For example, digital currency can be stored in currency form on the smartwatch for offline, or online, transactions.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
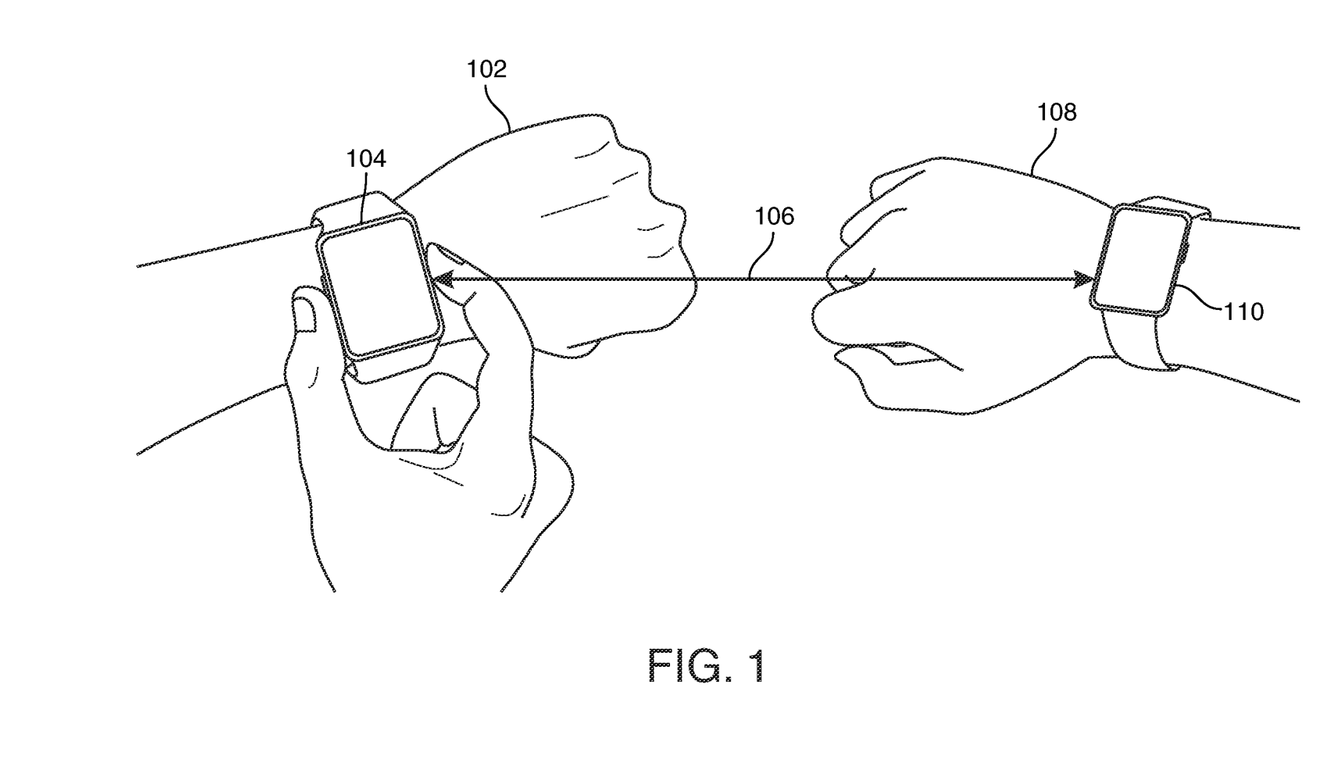
FIG. 1 shows an illustrative diagram in accordance with principles of the disclosure.

FIG. 1 shows an illustrative diagram. The illustrative diagram shows smartwatch-to-smartwatch communication. Smartwatch 104 may be worn by user 102. Smartwatch 110 may be worn by user 108. Smartwatch 104 and 110 may include capabilities such as those described above. Smartwatch 104 and smartwatch 110 may communicate with each other, as shown at communication 106. The communication may be an NFC-based communication. The communication may be a Wi-Fi-based communication. The communication may utilize any other suitable technology.

Figure 2:
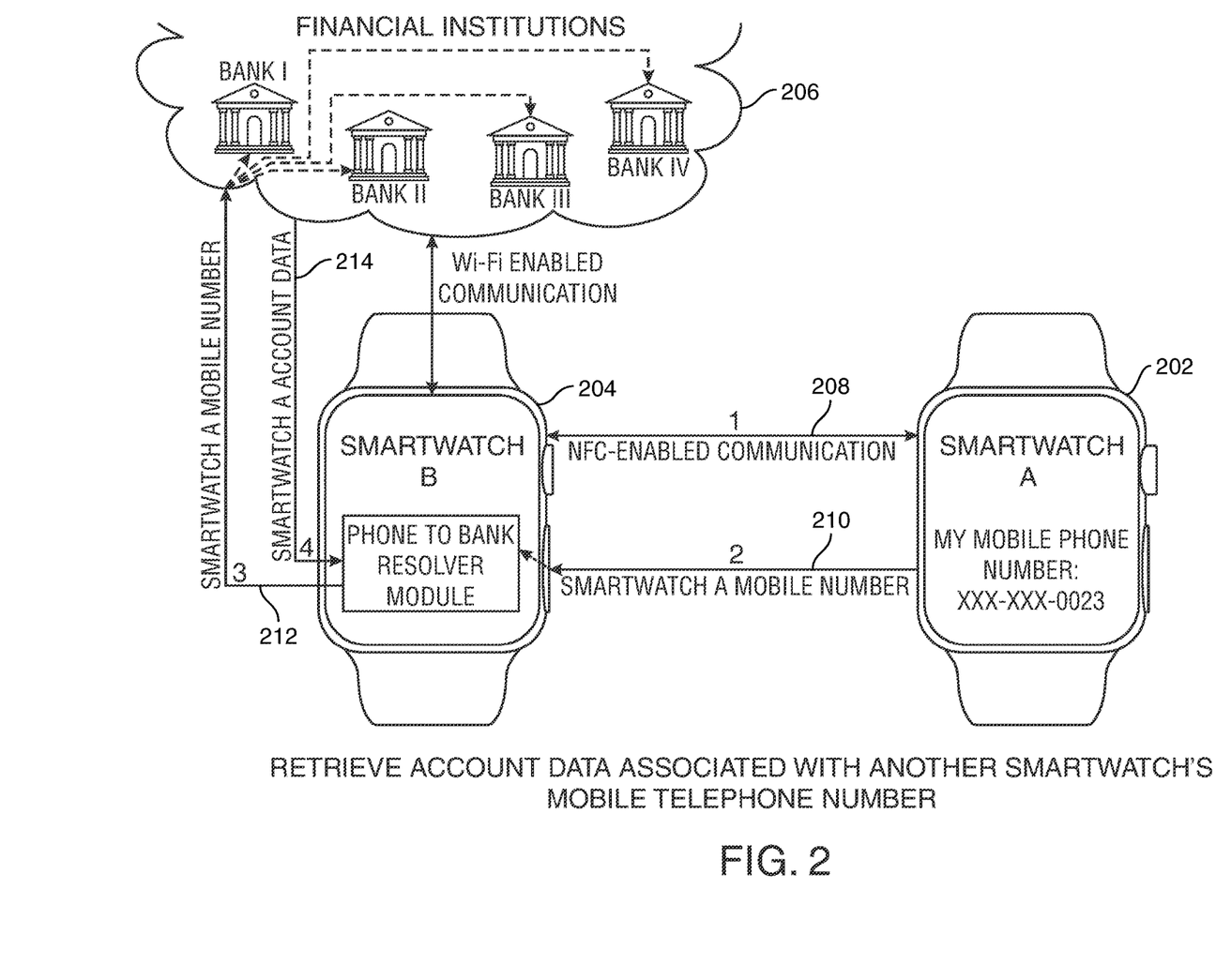
FIG. 2 shows another illustrative diagram in accordance with principles of the disclosure.

FIG. 2 shows an illustrative diagram. The illustrative diagram shows communication between a first smartwatch (smartwatch A), shown at 202, a second smartwatch (smartwatch B), shown at 204 and a plurality of financial institutions, shown at 206. The communications included in FIG. 2 show retrieving account data associated with another smartwatch's mobile telephone number.

It should be appreciated that the communications between smartwatch A and smartwatch B may be NFC-enabled or Bluetooth®-enabled communications. It should be further appreciated that the communications between smartwatch B and financial institutions 206 may be Wi-Fi®-enabled communications.

Smartwatch A may be associated with mobile telephone number XXX-XXX-0023. Smartwatch B may be associated with mobile telephone number XXX-XXX-6789 (not shown).

Step 1 of an exemplary communication is shown at 208. Step 1 may include initiation of a communication. The communication may be an NFC-enabled communication. The communication may be a payment communication. The payment communication may be transmitted from smartwatch A to smartwatch B and/or from smartwatch B to smartwatch A. In some embodiments, the initial communication between smartwatch A and smartwatch B may be a handshake communication.

The communication may include a transfer of funds instruction. The intent of the transfer of funds instruction may be to transfer funds from an account associated with smartwatch A to an account associated with smartwatch B. Each account may be linked to its respective smartwatch via the associated mobile telephone number. The payment communication that is transferred from smartwatch A to smartwatch B may include the mobile telephone number associated with smartwatch A.

Step 2 of the exemplary communication is shown at 210. In response to receiving the payment communication, smartwatch A may transmit its associated mobile telephone number to smartwatch B. The smartwatch A mobile telephone number may be received at the phone to bank resolver module within smartwatch B.

Step 3 of the exemplary communication is shown at 212. The phone to bank resolver module may communicate with each financial institution included in plurality of financial institutions 206. The communication may include attempting to identify account data associated with the smartwatch A mobile phone number. The phone to bank resolver may transmit the smartwatch A mobile phone number to each financial institution included in plurality of financial institutions 206. The response from each financial institution 206 may include either account data or a null response.

Financial institutions that do not have account data associated with the transmitted phone number may transmit null responses. In some embodiments, null responses may not be transmitted to smartwatch B. Rather, only responses with account data may be transmitted to the phone to bank resolver module.

Step 4 of the exemplary communication is shown at 214. The response, including the account data, may be received at the phone to bank resolver module. The phone to bank resolver module may link the received account data to the mobile phone number associated with smartwatch A.

Figure 3:
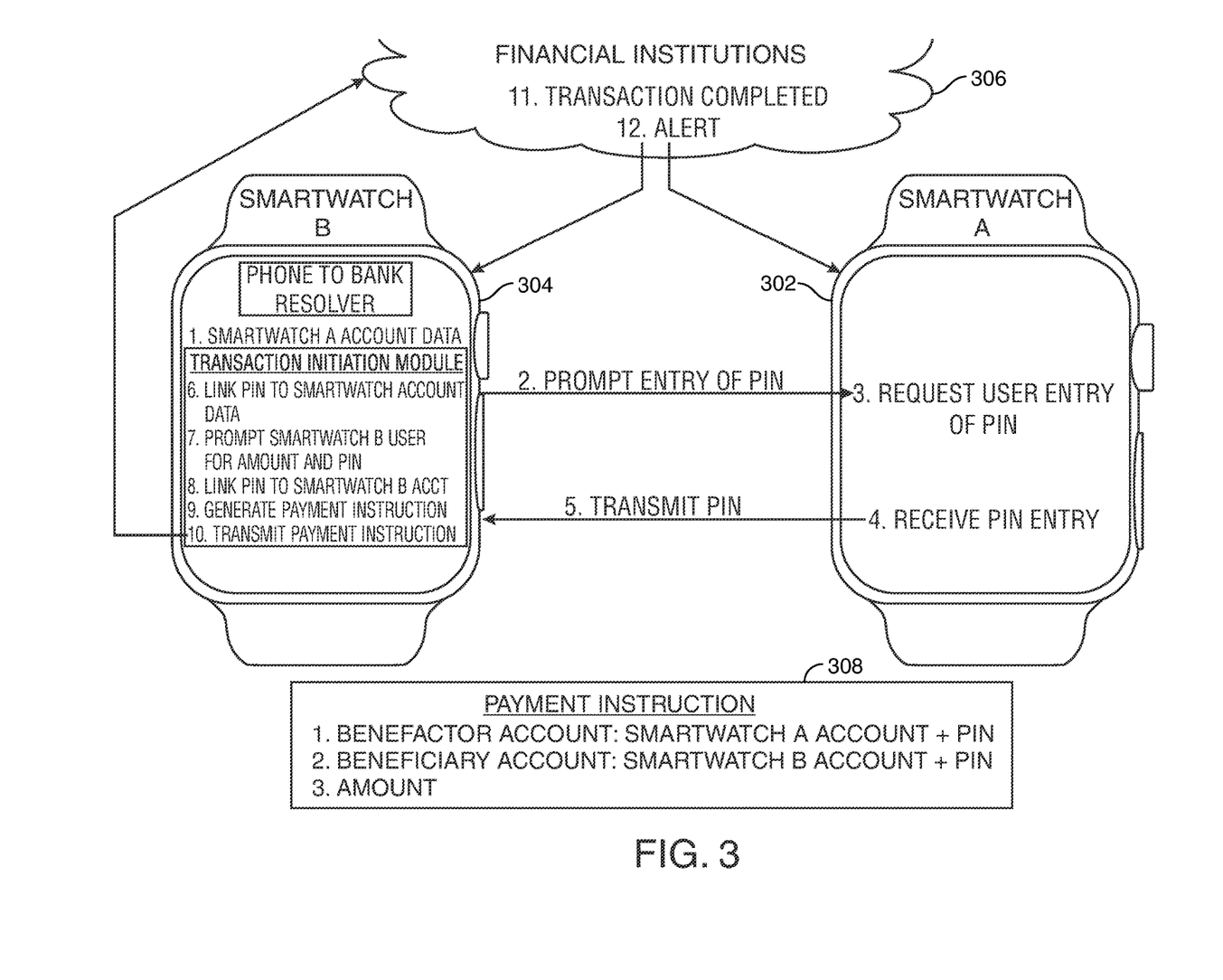
FIG. 3 shows yet another illustrative diagram in accordance with principles of the disclosure.

FIG. 3 shows an illustrative diagram. The illustrative diagram shows a completion of a transaction between smartwatch A, shown at 302, and smartwatch B, shown at 304 and financial institutions, shown at 306. It should be appreciated that the steps (1-12) shown in FIG. 3 commence after the smartwatch A account data was transmitted to smartwatch B.

Step 1 shows that the smartwatch A account data is stored in local memory of smartwatch B. The local memory may be any suitable memory included in the smartwatch.

Step 2 shows that smartwatch B may prompt, via NFC communication, smartwatch A to request user entry of PIN.

Step 3 shows smartwatch A request user entry of a PIN. The request may be presented to the user of smartwatch A. As such, the user of smartwatch A may authenticate the transaction by entering the PIN.

Step 4 shows smartwatch A receiving PIN entry from the user. It should be appreciated that the PIN may be entered via tap gestures or musical pattern gestures.

The tap gestures may be received at one or more portions of the smartwatch. Tap gestures may include receiving a series of taps. Each series of taps may correspond to a different value, such as a numerical value. Each series of taps may be separated from another series of taps with a delimiter.

A user of the smartwatch may enter a PIN using tap gestures. The numerical value of the PIN may be 6543. As such, the user of the smartwatch may tap six times, enter a delimiter, tap five times, enter a delimiter, tap four times, enter a delimiter and tap three times.

Examples of delimiters may include pausing for a predetermined time period, swiping, squeezing, holding a tap for a predetermined time period and any other suitable delimiter.

A touch-based musical pattern may include a user, of the smartwatch, tapping the touch screen with a predetermined number of fingers for a predetermined number of times. It should be appreciated that each tap may utilize a different number of fingers. For example, a musical pattern may include a two finger tap three times followed by a one finger tap two times followed by a four finger tap one time. As such, the PIN may not be a numerical PIN, rather a touch-based musical pattern PIN.

Step 5 shows smartwatch A transmits the received PIN to smartwatch B.

Step 6-10 are included in a transaction initiation module being executed on smartwatch B. Step 6 shows that the transaction initiation module may link the received PIN from smartwatch A to the smartwatch A account data.

Step 7 shows that the transaction initiation module may prompt the smartwatch B user for an amount of the transaction and a PIN associated with a smartwatch B account data. It should be appreciated that the smartwatch B account data may be stored on local memory included in smartwatch B.

Step 8 shows that the transaction initiation module may link the PIN, entered by the smartwatch B user, to the smartwatch B account data.

Step 9 shows that the transaction initiation module may generate a payment instruction. The payment instruction may be a payment instruction shown at 308. The payment instruction may include a benefactor account, such as smartwatch A account. The payment instruction may also include a PIN associated with the smartwatch A account. The payment instruction may include a beneficiary account, such as smartwatch B account. The payment instruction may also include a PIN associated with the smartwatch B account. The payment instruction may include an amount of the transaction.

It should be appreciated that although FIG. 3 shows smartwatch A as the benefactor and smartwatch B as the beneficiary, in other embodiments, the payment instruction may include smartwatch A as the beneficiary and smartwatch B as the benefactor.

Step 10 shows that the transaction initiation module may transmit the generated payment instruction to one or more financial institutions included in the plurality of financial institutions, shown at 306. The one or more financial institutions may be associated with the smartwatch A account and/or the smartwatch B account. In some instances, the payment instruction may be transmitted to a financial institution associated with both the smartwatch A account and the smartwatch B account. In other instances, the payment instruction may be transmitted to both a financial institution associated with the smartwatch A account and a financial institution associated with the smartwatch B account. In yet other instances, the payment instruction may be transmitted to either a financial institution associated with the smartwatch A account or a financial institution associated with the smartwatch B account. In such instances, the financial institution that receives the payment instruction may communicate with a financial institution that did not receive the payment instruction.

Step 11 shows that the transaction is completed between the one or more involved financial institutions. Step 12 shows that, once the transaction is completed, an alert indicating the completion of the transaction is transmitted to both smartwatch A and smartwatch B.

Figure 4:
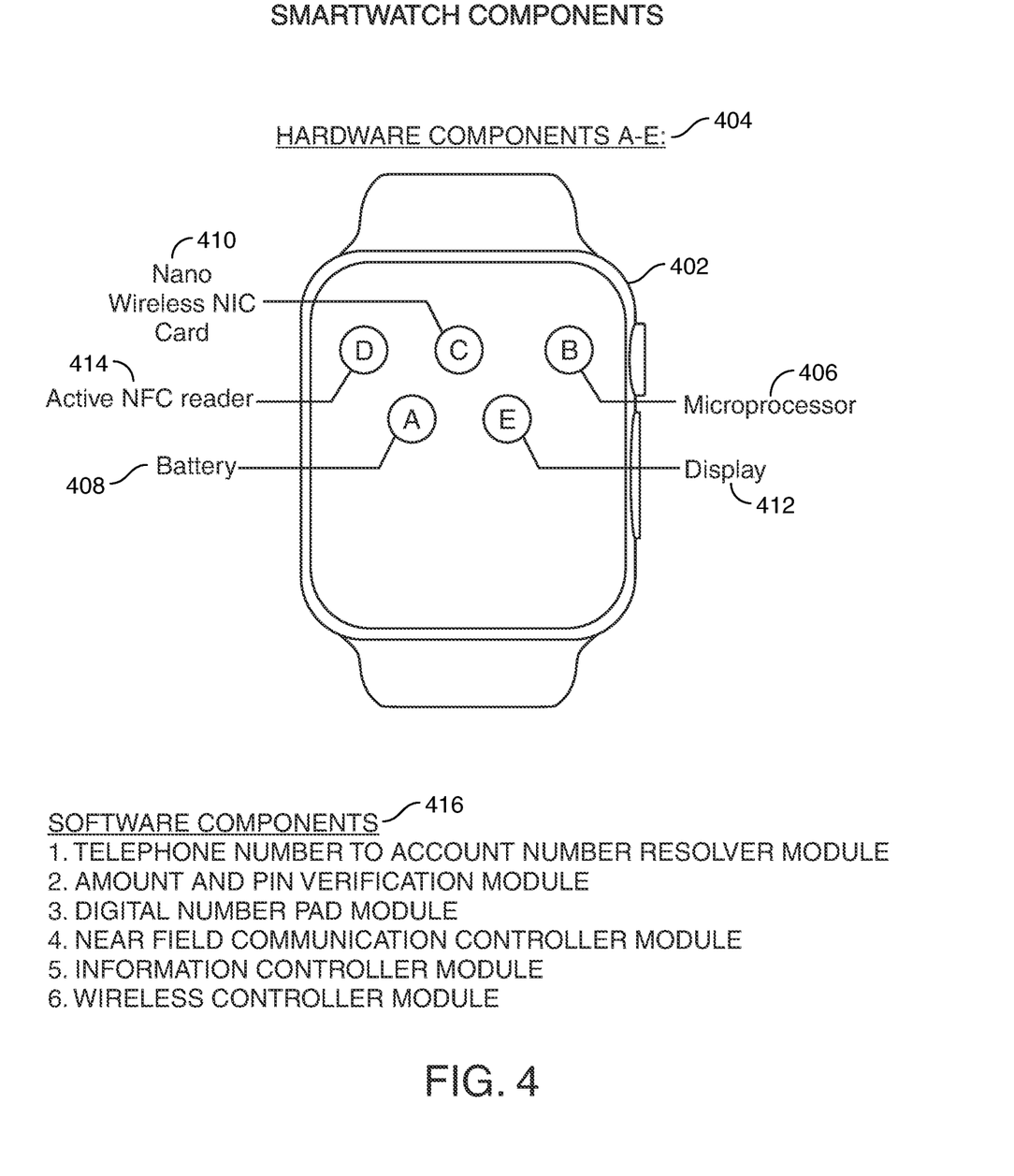
FIG. 4 shows still another illustrative diagram in accordance with principles of the disclosure.

FIG. 4 shows an exemplary diagram. The exemplary diagram includes a portion of the exemplary components included in smartwatch 402. The components may include two sets of components, hardware components, shown at 404 and software components, shown at 416.

Hardware components may include component A, a battery, shown at 408. The battery may power other components of the smartwatch, such as the display and the microprocessor.

Hardware components may include component B, a microprocessor, shown at 406. The microprocessor may execute the processes within the smartwatch. The microprocessor may also initiate transactions.

Hardware components may include component C, shown at 410, a nano wireless NIC. The nano wireless NIC may establish communication between the smartwatch and a nearby wireless network. The wireless network may enable the smartwatch to communicate with a financial institution.

Hardware components may include component D, shown at 414, an active NFC reader. The active NFC reader may detect the proximity of other smartwatches. The active NFC reader may establish communication between the smartwatch and the other smartwatches.

Hardware components may include component E, shown at 412, a display. The display may display software-based displays to the user.

Software components, shown at 416, may include a telephone number to account number resolver module. The telephone number to account number resolver module may communicate with the financial institution to identify an account number associated with a telephone number.

Software components may include an amount and PIN verification module. The amount and PIN verification module may verify the amount of the transaction and the PIN with the financial institution.

Software components may include a digital number pad module. The digital number pad module may display a digital number pad to the smartwatch user. The digital number pad module may also receive user input.

In some embodiments, the digital number pad may include selectable numbers. In other embodiments, the digital number pad may appear as an empty entry screen. An empty entry screen may accept tap gestures or a musical pattern, such as those described above.

In some embodiments, the digital number pad may accept scripted numbers as user input. The user input may be entered via a stylus, finger or other suitable input medium.

Software components may include an NFC controller module. The NFC controller module may activate NFC with the active NFC reader. The NFC controller module may send and/or receive user data, payment data and/or authentication data.

Software components may include an information controller module. The information controller module may capture amount and PIN information from the user.

Software components may include a wireless controller module. The wireless controller module may interface between the nano wireless NIC and an external Wi-Fi device.

Figure 5:
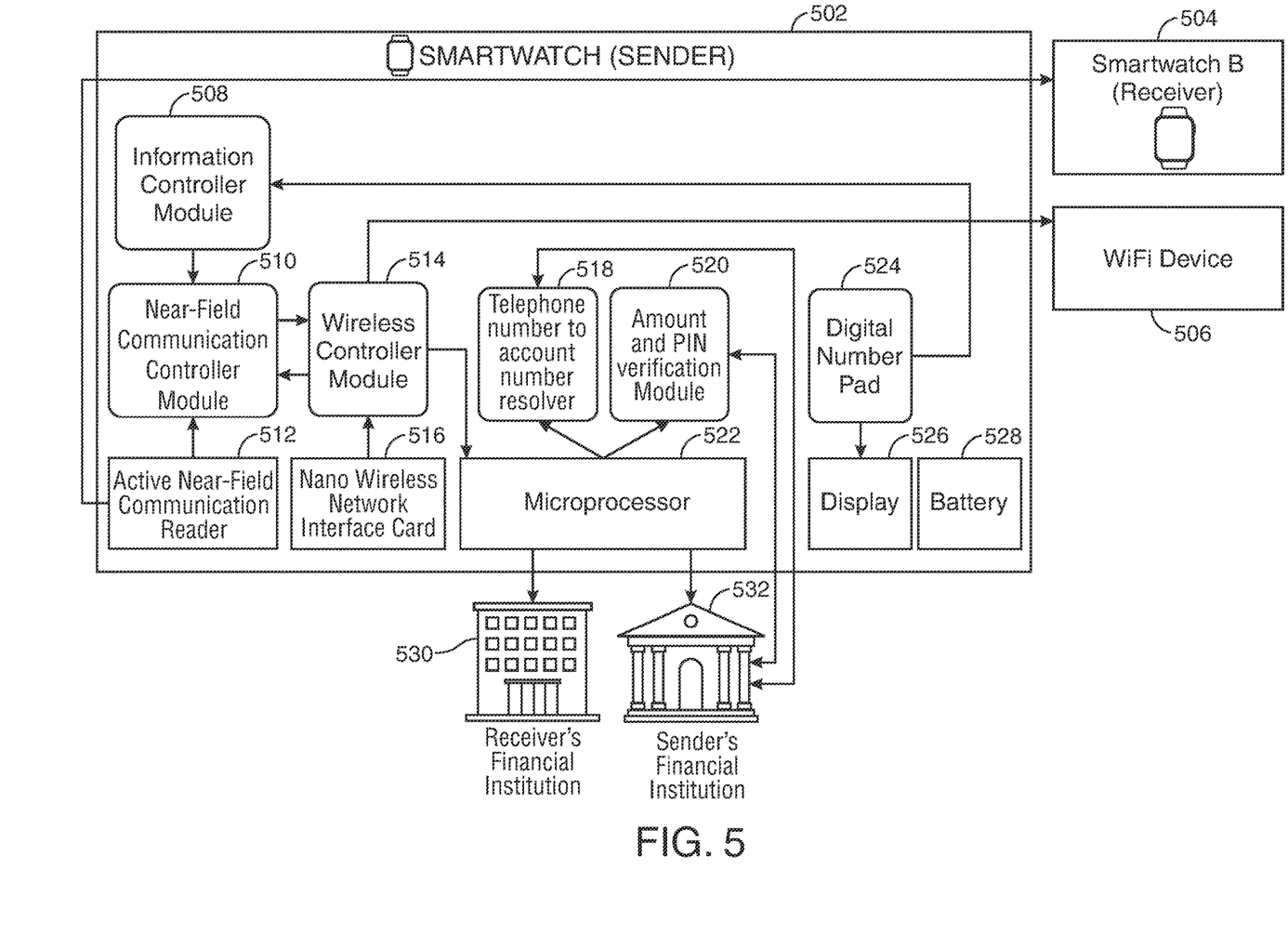
FIG. 5 shows still yet another illustrative diagram in accordance with principles of the disclosure.

FIG. 5 shows a payment system where funds can be transferred from an account associated with a first smartwatch (502) to an account associated with a second smartwatch (504).

Smartwatch 502 may include microprocessor 522. Battery 528 may power microprocessor 522. Microprocessor 522 may initiate a transaction.

Smartwatch 502 may also include digital number pad 524. Digital number pad 524 may be displayed on display 526. Digital number 524 pad may receive numerical user input. The numerical user input may be received in tap gestures, touch gestures, musical patterns or any other suitable user input.

Smartwatch 502 may also include nano wireless NIC card 516. Nano wireless NIC card 516 may be responsible for establishing communication with a nearby wireless network.

Smartwatch 502 may also include an active NFC reader 512. NFC reader 512 may detect smartwatches in a predetermined vicinity. NFC reader 512 may establish communication with the detected smartwatch, such as smartwatch 504.

Smartwatch 502 may also include a telephone number to account number resolver 518. Telephone number to account number resolver 518 may identify financial institution account information associated with a telephone number.

Telephone number to account number resolver 518 may communicate with an entity, such as a financial institution. The financial institution may store account information. The financial institution may process transactions.

Smartwatch 502 may also include an amount and PIN verification module 520. Amount and PIN verification module 520 may capture user input relating to an amount and a PIN. Amount and PIN verification module 520 may capture the tap-gesture-based user input.

Active NFC reader 512 may communicate with NFC controller 510. NFC controller 510 may activate NFC communication. NFC controller 510 may send and receive a user's payment and authentication data.

Smartwatch 502 may also include information controller 508. Information controller 508 may communicate with amount and PIN verification module 520. Information controller 508 may capture amount and PIN information. Information controller 508 may transfer the captured amount and PIN information to NFC controller 510.

NFC controller 510 and nano wireless NIC card 516 may communicate with wireless controller 514. Wireless controller 514 may communicate with external Wi-Fi device 506.

Wireless controller 514 may communicate with microprocessor 522. Microprocessor 522 may communicate with a receiver's financial institution 530 and a sender's financial institution 532.

Thus, smartwatch-to-smartwatch payment systems are provided. Persons skilled in the art will appreciate that the present invention can be practiced by other than the described embodiments, which are presented for purposes of illustration rather than of limitation. The present invention is limited only by the claims that follow.

What is claimed is:

1. A method for smartwatch-to-smartwatch transactions, the method comprising:
    generating a transaction initiation at a first smartwatch;
    triggering, by the transaction initiation, transmission, from the first smartwatch to a second smartwatch, a request for a second smartwatch telephone number, said second smartwatch telephone number associated with the second smartwatch;
    transmitting, from the second smartwatch to the first smartwatch, the second smartwatch telephone number;
    requesting a transaction amount and a personal identification number at the first smartwatch;
    receiving, at the first smartwatch, the transaction amount and the personal identification number via tap gestures to one or more portions of the first smartwatch, said tap gestures including receiving a series of taps, each series of taps corresponds to a numerical value, each series of taps being separated from another series of taps with a delimiter;
    generating a transaction request at the first smartwatch, said transaction request comprising:
        a first smartwatch telephone number, said first smartwatch telephone number associated with the first smartwatch;
        the second smartwatch telephone number;
        the transaction amount; and
        the personal identification number;
    transmitting the transaction request to a processing entity;
    processing the transaction request at the processing entity; and
    receiving, at the first smartwatch and at the second smartwatch, a transaction confirmation from the entity.

2. The method of claim 1, wherein:
    the first smartwatch comprises a first near field communication ("NFC") component;
    the second smartwatch comprises a second NFC component; and
    the first smartwatch and the second smartwatch communicate with each other via the first NFC component and the second NFC component.

3. A method for smartwatch-to-smartwatch transactions, the method comprising:
    generating a transaction initiation at a first smartwatch;
    triggering, by the transaction initiation, transmission, from the first smartwatch to a second smartwatch, a request for a second smartwatch telephone number, said second smartwatch telephone number associated with the second smartwatch;
    transmitting, from the second smartwatch to the first smartwatch, the second smartwatch telephone number;
    transmitting the second smartwatch telephone number, from the first smartwatch to an entity;
    receiving at the first smartwatch, an account number associated with the second smartwatch telephone number;
    requesting a transaction amount and a personal identification number at the first smartwatch;
    receiving, at the first smartwatch, entry of the transaction amount;
    receiving, at the first smartwatch, entry of the personal identification number via a touch-based musical pattern, the touch-based musical pattern includes a user tapping the touch screen with a predetermined number of fingers a predetermined number of times;
    generating a transaction request at the first smartwatch, said transaction request comprising:
        an account associated with a first smartwatch telephone number;
        the account associated with the second smartwatch telephone number;
        the transaction amount; and
        the personal identification number;
    transmitting the transaction request to the entity;
    processing the transaction request at the entity;
    receiving, at the first smartwatch and at the second smartwatch, a transaction confirmation from the entity.

4. The method of claim 3, wherein:
    the first smartwatch comprises a first near field communication ("NFC") component;

the second smartwatch comprises a second NFC component; and the first NFC component and the second NFC component execute the transmissions between the first smartwatch and the second smartwatch.

5. The method of claim 3, wherein the transaction is a transfer of funds transaction.

6. The method of claim 5, wherein:

a beneficiary of the transfer of funds transaction is the account associated with the second smartwatch telephone number; and a benefactor of the transfer of funds transaction is the account associated with the first smartwatch telephone number.

\* \* \* \* \*